(12) United States Patent
Tian

(10) Patent No.: US 11,201,359 B2
(45) Date of Patent: Dec. 14, 2021

(54) CHARGING CONTROL METHOD AND APPARATUS, AND COMPUTER READABLE STORAGE MEDIUM

(71) Applicant: GUANGDONG OPPO MOBILE TELECOMMUNICATIONS CORP., LTD., Guangdong (CN)

(72) Inventor: Chen Tian, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 122 days.

(21) Appl. No.: 16/713,397

(22) Filed: Dec. 13, 2019

(65) Prior Publication Data

US 2020/0119410 A1 Apr. 16, 2020

Related U.S. Application Data

(63) Continuation of application No. PCT/CN2018/105292, filed on Sep. 12, 2018.

(51) Int. Cl.
*H01M 10/44* (2006.01)
*H02J 7/00* (2006.01)

(52) U.S. Cl.
CPC ............. *H01M 10/44* (2013.01); *H02J 7/007* (2013.01)

(58) Field of Classification Search
CPC .. H01M 10/44; H01M 10/486; H01M 10/425; H01M 10/443; H02J 7/007; H02J 7/007194; H02J 7/00714; H02J 7/0063; H02J 2007/0067; H02J 7/007192; H02J 7/0072; H02J 7/0091; H02J 7/042; H02J 7/087; H02J 2007/10; H02J 7/125; Y02E 60/10
See application file for complete search history.

(56) References Cited

U.S. PATENT DOCUMENTS

2013/0264999 A1* 10/2013 Srinivasan .......... H01M 50/572
320/107
2016/0301225 A1* 10/2016 Shiraishi ................ H02J 7/007
(Continued)

FOREIGN PATENT DOCUMENTS

| CN | 101969218 | 2/2011 |
| CN | 103107378 | 5/2013 |

(Continued)

OTHER PUBLICATIONS

EPO, Extended European Search Report for EP Application No. 18933062.4, dated Oct. 2, 2020.
(Continued)

*Primary Examiner* — Nha T Nguyen
(74) *Attorney, Agent, or Firm* — Hodgson Russ LLP

(57) ABSTRACT

Provided are a charging control method, a charging control apparatus, and a computer readable storage medium. The charging control method includes the following. A charging parameter currently used for charging a battery is acquired, when an electronic device is in a constant-current charging mode. A temperature of the battery is acquired when the charging parameter reaches a preset parameter. A charging cut-off current of the battery is regulated according to the temperature. The charging cut-off current is continuously applied to the battery until the battery is fully charged.

17 Claims, 5 Drawing Sheets

(56) References Cited

U.S. PATENT DOCUMENTS

2016/0301226 A1* 10/2016 Matsumura ........... H02J 7/0029
2017/0104359 A1* 4/2017 Jung ....................... H02J 7/045

FOREIGN PATENT DOCUMENTS

| CN | 103107378 | 8/2016 |
| CN | 106655388 | 5/2017 |
| JP | 2001314046 | 11/2001 |
| WO | 2013077157 | 5/2013 |
| WO | WO2013077157 | * 5/2013 |

OTHER PUBLICATIONS

IPI, Office Action for IN Application No. 201917053123, dated Nov. 5, 2020.
WIPO, ISR for PCT/CN2018/105292, Jun. 14, 2019.

* cited by examiner

CHARGING CONTROL METHOD AND APPARATUS, AND COMPUTER READABLE STORAGE MEDIUM

CROSS-REFERENCE TO RELATED APPLICATION

This application is a continuation of International Application No. PCT/CN2018/105292, filed on Sep. 12, 2018, the entire disclosure of which is incorporated herein by reference.

TECHNICAL FIELD

This disclosure relates to the technical field of electronic devices, and more particularly to a charging control method, a charging control apparatus, and a computer readable storage medium.

BACKGROUND

With development of electronic technology, electronic devices (such as smart phones) are becoming increasingly more popular among consumers. However, the electronic device usually needs to be charged frequently due to high power consumption.

In general, charging of a battery of the electronic device includes three charging stages, that is, a trickle charging stage, a constant-current charging stage, and a constant-voltage charging stage. Traditionally, the constant-voltage charging stage is the final charging stage of charging of the battery, which affects charging efficiency of the battery.

SUMMARY

A charging control method for charging a battery of an electronic device is provided. The method includes the following. A charging parameter currently used for charging the battery is acquired, when the electronic device is in a constant-current charging mode. A temperature of the battery is acquired when the charging parameter reaches a preset parameter. A charging cut-off current of the battery is regulated according to the temperature. The charging cut-off current is continuously applied to the battery until the battery is fully charged.

A charging control apparatus for charging a battery of an electronic device is provided. The apparatus includes a processor and a memory configured to store computer readable instructions which, when executed by the processor, are operable with the processor to: acquire a charging parameter currently used for charging the battery when the electronic device is in a constant-current charging mode; acquire a temperature of the battery when the charging parameter reaches a preset parameter; regulate, according to the temperature, a charging cut-off current of the battery; apply continuously the charging cut-off current to the battery until the battery is fully charged.

A computer readable storage medium is provided. The computer readable storage medium is configured to store computer programs which, when executed by a processor, are operable with the processor to perform the method described above.

BRIEF DESCRIPTION OF THE DRAWINGS

In order to describe more clearly technical solutions of implementations or the related art, the following will give a brief introduction to the accompanying drawings used for describing implementations or the related art. Apparently, the accompanying drawings described below are merely some implementations. For those of ordinary skill in the art, accompanying drawings of other implementations can also be obtained based on the accompanying drawings described below without creative efforts.

DETAILED DESCRIPTION

In order to better understand implementations, the following will describe implementations in further detail in connection with the accompanying drawings. The accompanying drawings illustrate exemplary implementations. However, the disclosure can be implemented in various different manners and is not limited to the implementations herein. Instead, the implementations are provided for a more complete and comprehensive understanding of content disclosed in the disclosure.

In order to make the purpose, the technical solutions, and the advantages of the implementations easier to understand, hereinafter, the implementations will be elaborated with reference to the accompanying drawings. It should be understood that, the implementations described herein are merely intended for explaining, rather than limiting, the disclosure.

Implementations provide a charging control method, in which: a charging parameter currently used for charging the battery is acquired, when the electronic device is in a constant-current charging mode; temperature of the battery is acquired when the charging parameter reaches a preset parameter; charging cut-off current of the battery is regulated according to the temperature; the charging cut-off current is continuously applied to the battery until the battery is fully charged.

Figure 1:
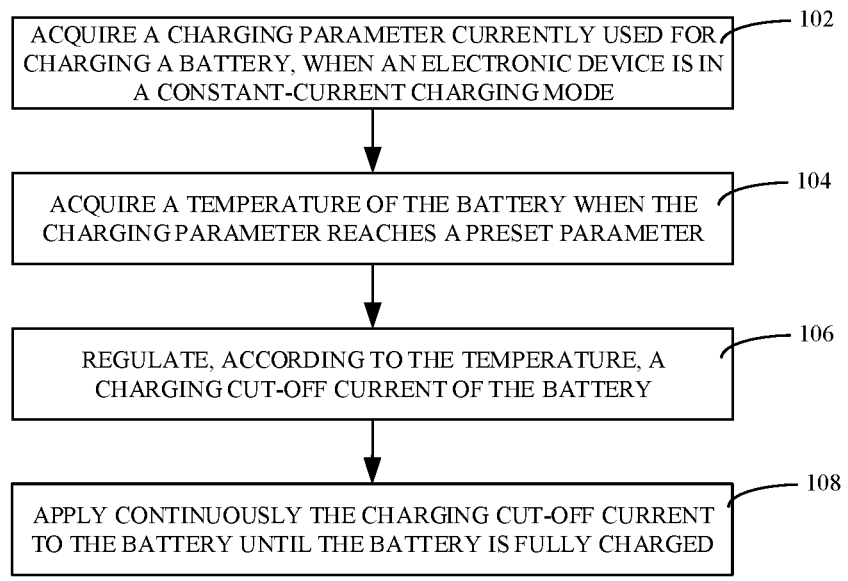
FIG. 1 is a schematic flowchart of a charging control method according to implementations.

FIG. 1 is a schematic flowchart of a charging control method according to implementations. The method begins at block 102.

At block 102, when an electronic device is in a constant-current charging mode, a charging parameter currently used for charging a battery is acquired.

The electronic device can be provided with a built-in charging circuit. The charging circuit can include a charging chip configured to control charging of the electronic device.

The charging circuit has an input end coupled with a charging interface of the electronic device and has an output end coupled with the battery, such that the charging circuit can charge the battery via a charging device of the electronic device. For example, the charging interface may be a Micro USB interface, a Type-C interface, a 30-pin interface, or a Lightning interface.

It is to be noted that, there is no restriction on the type of the charging device in implementations. For example, the charging device may be a specialized device for charging such as an adaptor, a power bank, etc., or may be other devices which can provide both power supply service and data service, such as a computer.

Charging of the electronic device generally includes a trickle charging stage, a constant-current charging stage, and a constant-voltage charging stage. However, charging of the electronic device is not limited to the above three stages and may further include other stages. The whole charging process is under control of the charging chip. During use of the electronic device, whether the electronic device such as a smart phone is in a charging state can be detected by detecting periodically a voltage of the input end of the charging circuit or by detecting a voltage of the charging chip. When the electronic device is in the charging state, whether a charging mode is the constant-current charging mode can be determined by acquiring a control state of the charging chip. When the control state of the charging chip is constant-current charging, the charging mode of the electronic device is determined to be the constant-current charging mode.

It is to be noted that, the constant-current charging mode however does not mean that a charging current applied to the battery of the electronic device remains unchanged. The constant-current charging mode relates to multi-stage constant-current charging, and each stage of the multi-stage constant-current charging has a different charging parameter. In other words, the charging parameter remains unchanged within a certain time period. For example, the constant-current charging mode uses five constant-current charging stages, and each of the five constant-current charging stages has a different charging parameter.

In an example, the charging parameter refers to the charging current. In this regard, each charging stage has a different charging current, and the charging current remains constant in a same charging stage. When the electronic device is in the constant-current charging mode, the charging current currently applied to the battery can be acquired.

At block 104, when the charging parameter reaches a preset parameter, a temperature of the battery is acquired.

The constant-current charging mode involves multiple constant-current charging stages, that is, multi-stage constant-current charging, which can be respectively referred to as a first charging stage, a second charging stage, a third charging stage, . . . , and an $N^{th}$ charging stage. The electronic device can establish in advance a mapping relationship between a charging stage and a charging current corresponding to the charging stage. For example, the first charging stage has the largest charging current, and the $N^{th}$ charging stage has the smallest charging current. The charging current decreases in sequence in a step-like manner from the first charging stage to an $(N-1)^{th}$ charging stage. The magnitude of decrease in each charging stage may be the same or different. The $N^{th}$ charging stage can be comprehended as a final charging stage of the constant-current charging mode, that is, the battery can be fully charged after undergoing the $N^{th}$ charging stage.

In an example, the charging parameter is the charging current. When the charging current acquired by the electronic device reaches (here, decreases to) a preset current, the present temperature of the battery can be acquired. The preset current can be comprehended as a charging current in the $(N-1)^{th}$ charging stage. When the charging current applied to the electronic device reaches the preset current, it indicates that the battery is currently in the $(N-1)^{th}$ charging stage and is about to proceed to the $N^{th}$ charging stage. The $N^{th}$ charging stage can be comprehended as the final charging stage of a charging process of the battery.

It is to be noted that, the "multi" of the "multi-stage constant-current charging" can be comprehended as any integer greater than or equal than two. The magnitude of a charging current in the first charging stage and the magnitude of a charging current in the $(N-1)^{th}$ charging stage can also be set according to actual needs, which is not limited herein.

When the charging current applied to the electronic device reaches the preset current, the temperature of the battery can be acquired with a built-in temperature sensor in the electronic device. In an example, the temperature sensor may be disposed on the battery or near the battery. In an example, the temperature sensor is a thermistor. The thermistor is a kind of sensitive component, which is sensitive to temperature and has different resistance values in different temperatures. Alternatively, the temperature sensor may be a thermocouple, a platinum resistor, a temperature integrated circuit (IC), or the like. The type of the temperature sensor is not particularly limited in implementations.

In an example, after detecting that the electronic device is coupled with an adaptor, the electronic device can determine the type of the adaptor. Upon determining that the adaptor is a non-USB adaptor, the electronic device sends a charging instruction to the adaptor, and the charging instruction is for requesting the adaptor to charge the battery of the electronic device in a quick charging mode. The electronic device is operable in a normal charging mode or in the quick charging mode, where a speed at which the battery is charged in the quick charging mode is higher than that in the normal charging mode. When the adaptor receives the charging instruction, the electronic device can negotiate with the adaptor for a charging current corresponding to the quick charging mode, that is, enable the quick charging mode of the adaptor, whereby the adaptor adjusts, according to state information of the battery, an output current thereof to the charging current corresponding to the quick charging mode.

At block 106, a charging cut-off current of the battery is regulated according to the temperature.

In the electronic device, an internal resistance of the battery varies with the temperature of the battery. For the same charging current, due to different internal resistances of the battery, a charging voltage applied to the battery will be affected. As a result, overcharging will occur, or the charging voltage will be unable to reach a rated charging voltage.

The electronic device can acquire the temperature of the battery in the $(N-1)^{th}$ charging stage and dynamically adjust the charging cut-off current of the battery according to the temperature currently acquired. The charging cut-off current can refer to a charging current corresponding to the $N^{th}$ charging stage. The $N^{th}$ charging stage can be comprehended as the final charging stage of the constant-current charging mode, that is, the battery can be fully charged after undergoing the $N^{th}$ charging stage.

At block 108, the charging cut-off current is continuously applied to the battery until the battery is fully charged.

The electronic device can apply continuously the charging cut-off current acquired to the battery until the battery is fully charged, that is, apply continuously the charging cut-off current to the battery in a constant-current charging manner until the battery is fully charged, that is, reaches an end state of charging.

In an example, the electronic device can acquire a real voltage across a cell of the battery. When the real voltage across the cell is equal to a rated voltage, it indicates that the battery is fully charged, that is, the battery is in a fully-charged state and the electric quantity of the battery is full. At this time, the battery reaches the charging-end state.

In the charging control method provided herein, when the electronic device is in the constant-current charging mode, the charging parameter currently used for charging the battery is acquired. The temperature of the battery is acquired when the charging parameter reaches the preset parameter. The charging cut-off current of the battery is regulated according to the temperature. The charging cut-off current is continuously applied to the battery until the battery is fully charged. As such, a duration of the constant-current charging mode is prolonged, and a constant-voltage charging stage is omitted, thereby improving charging efficiency. At the same time, the charging cut-off current can be dynamically adjusted according to the temperature of the battery, which can ensure that the battery will be fully charged, without being damaged due to overvoltage in a constant-current charging stage.

Figure 2:
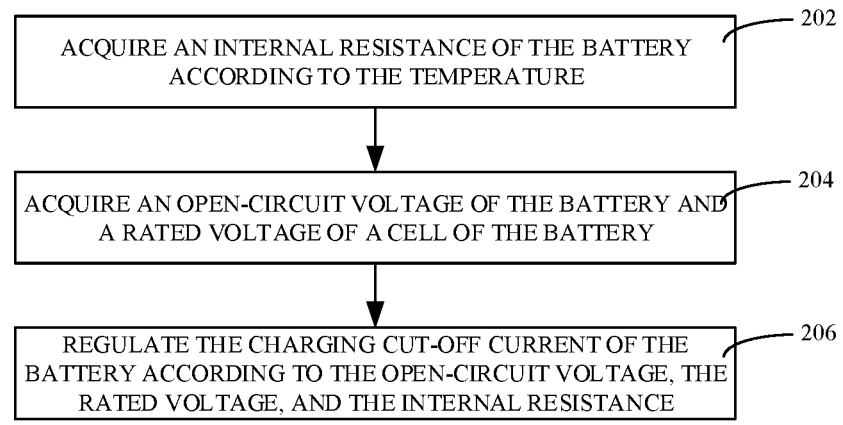
FIG. 2 is a schematic flowchart illustrating regulation of a charging cut-off current of a battery according to temperature according to implementations.

FIG. 2 is a schematic flowchart illustrating regulation of the charging cut-off current of the battery according to the temperature according to implementations. As illustrated in FIG. 2, the regulation of the charging cut-off current of the battery according to the temperature includes operations at block 202 to block 206.

At block 202, an internal resistance of the battery is acquired according to the temperature.

The internal resistance of the battery refers to a resistance to a current which flows through the battery when the battery works. The internal resistance of the battery includes an ohmic resistance and a polarization resistance. The ohmic resistance is composed of a resistance of electrode materials, a resistance of electrolyte, a resistance of isolation membrane, and a contact resistance of each component. The polarization resistance is caused by polarization during an electrochemical reaction. The polarization resistance includes resistances caused by electrochemical polarization and concentration polarization. The internal resistance of the battery can be indicative of the service life and the working state of the battery and difficulty of transport of electrons and ions inside an electrode. An initial value of the internal resistance mainly depends on the material of the battery, the manufacturing process of the battery, the structure of the battery, etc.

The internal resistance of the battery varies with the temperature. With increase in temperature, the internal resistance of the battery will decrease. When the temperature is lower than 10° C., the internal resistance of the battery decreases significantly with increase in temperature, and a higher temperature will result in a lower internal resistance of the battery.

In some implementations, the internal resistance of the battery is acquired according to the temperature as follows. A mapping relationship between the internal resistance and the temperature is established. The internal resistance corresponding to the temperature is determined according to the mapping relationship. The electronic device can store in advance the mapping relationship between the internal resistance and the temperature, and the temperature is in one-to-one correspondence with the internal resistance. For example, the internal resistance measured at room temperature 25° C. is taken as a standard internal resistance of the battery. Accordingly, the internal resistance at room temperature 20° C. is 1.07 times the standard internal resistance of the battery. The internal resistance at room temperature 15° C. is 1.20 times the standard internal resistance of the battery. The internal resistance at room temperature 10° C. is 1.25 times the standard internal resistance of the battery. The internal resistance at room temperature 5° C. is 1.30 times the standard internal resistance of the battery. At a low temperature of −20° C., the internal resistance is 3 times the standard internal resistance of the battery and 4 times the internal resistance at a high temperature of 55° C.

At block 204, an open-circuit voltage of the battery and a rated voltage of a cell in the battery are acquired.

Figure 3:
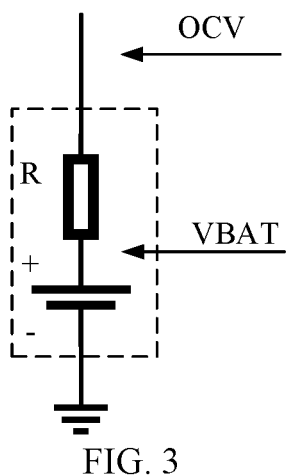
FIG. 3 is a schematic diagram of an equivalent model of a battery according to implementations.
Figure 4:
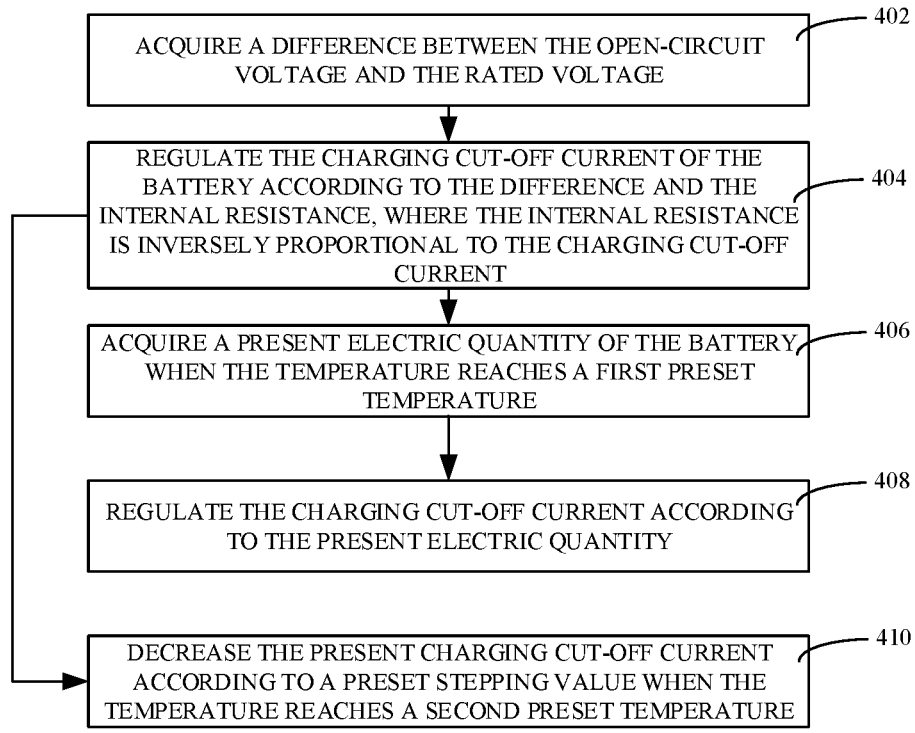
FIG. 4 is a schematic flowchart illustrating regulation of a charging cut-off current of a battery according to open-circuit voltage, rated voltage, and internal resistance according to implementations.
Figure 5:
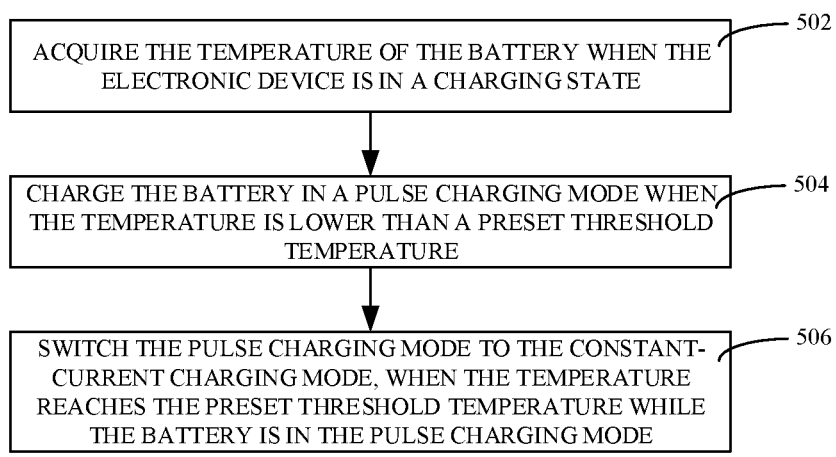
FIG. 5 is a schematic flowchart of a charging control method according to other implementations.
Figure 6:
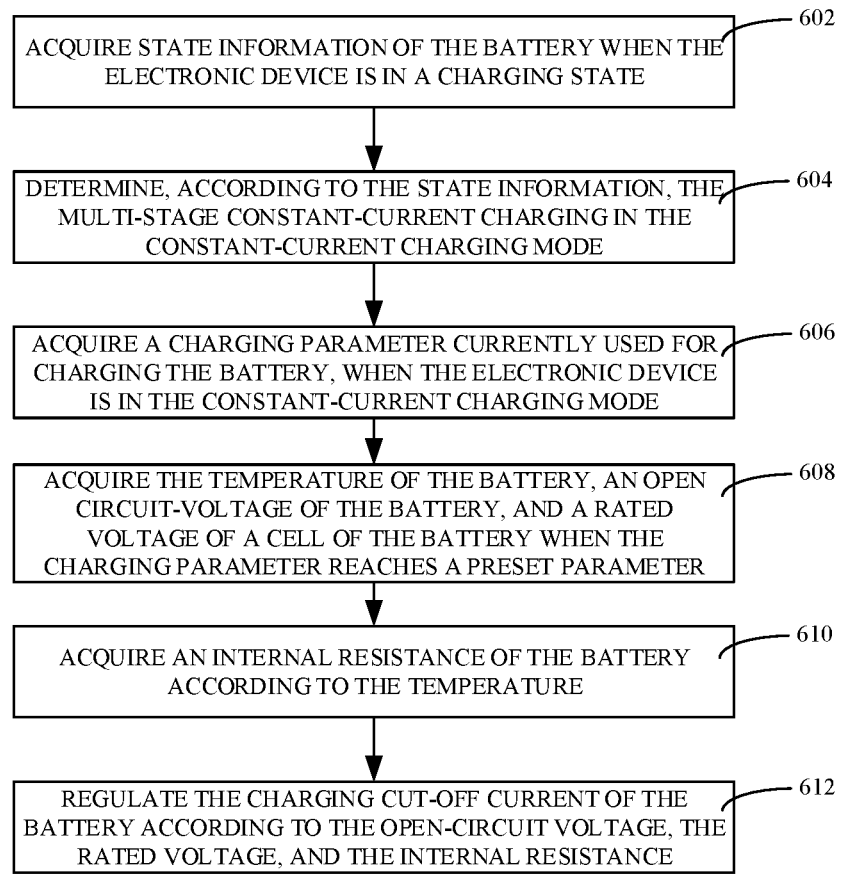
FIG. 6 is a schematic flowchart of a charging control method according to other implementations.

FIG. 3 is a schematic diagram of an equivalent model of a battery according to implementations. As illustrated in FIG. 3, OCV represents the open-circuit voltage of the battery, where the open-circuit voltage is a difference of electrical potential between a positive electrode and a negative electrode of the battery when an external circuit is disconnected. VBAT represents a real voltage across the cell in the battery.

In an example, the electronic device acquires the open-circuit voltage of the battery (OCV). For example, the electronic device can control the external circuit of the battery to be disconnected to acquire the difference of electrical potential between the positive electrode and the negative electrode of the battery.

In an example, the open-circuit voltage is a sum of the real voltage across the cell and a voltage of the internal resistance, which can be represented by the following formula:

$$OCV = I*R + VBAT$$

In the above formula, OCV represents the open-circuit voltage of the battery. VBAT represents the real voltage across the cell of the battery. I represents a charging current in the constant-current charging stage, where I may be smaller than or equal to the charging cut-off current. R represents the internal resistance of the battery.

The electronic device acquires the rated voltage of the cell of the battery. The "rated voltage" can be comprehended as an optimal voltage when the battery is in a normal state. The rated voltage is also referred to as a nominal voltage. When a working voltage of the cell is higher than the rated voltage, the cell will be easily damaged. However, when the working voltage of the cell is lower than the rated voltage, the cell will be unable to work normally.

At block 206, the charging cut-off current of the battery is regulated according to the open-circuit voltage, the rated voltage, and the internal resistance.

The electronic device acquires the open-circuit voltage of the battery, the rated voltage of the cell, and the internal resistance of the battery. According to the above formula, that is, OCV=I*R+VBAT, when the real voltage across the cell reaches the rated voltage, it indicates that the battery is fully charged. In other words, if VBAT=the rated voltage, then I=(OCV—the rated voltage)/R, and as such, the present charging cut-off current of the battery can be calculated.

In some implementations, the charging cut-off current of the battery is regulated according to the open-circuit voltage, the rated voltage, and the internal resistance as follows.

At block 402, a difference between the open-circuit voltage and the rated voltage is acquired.

At block 404, the charging cut-off current of the battery is regulated according to the difference and the internal resistance, where the internal resistance is inversely proportional to the charging cut-off current.

In an example, the electronic device acquires the difference between the open-circuit voltage and the rated voltage, that is, the difference $\delta = OCV$—the rated voltage. When the real voltage across the cell (VBAT) is equal to the rated voltage, it indicates that the battery is fully charged. In this situation, the present charging cut-off current of the battery can be regulated according to the difference thus obtained and the internal resistance. The internal resistance is inversely proportional to the charging cut-off current, that is, a higher internal resistance will lead to a smaller charging cut-off current, and a lower internal resistance will lead to a larger charging cut-off current.

In an example, when an electric quantity of the battery is 100%, a product of the charging cut-off current and the internal resistance is equal to the difference between the open-circuit voltage and the rated voltage, that is, $I*R = OCV$—the rated voltage. When the temperature of the battery decreases, the internal resistance of the battery R will increase accordingly. In order to ensure that the real voltage across the cell will not exceed the rated voltage while ensuring that the battery will be fully charged, the charging cut-off current of the battery can be decreased, where the expression "decreasing the charging cut-off current" can be comprehended as decreasing the charging cut-off current relative to the charging cut-off current measured in the room temperature of 25° C. When the temperature of the battery increases, the internal resistance of the battery R will decrease accordingly. In order to ensure that the real voltage across the cell will not exceed the rated voltage while ensuring that the battery will be fully charged, the charging cut-off current of the battery can be increased, where the expression "increasing the charging cut-off current" can be comprehended as increasing the charging cut-off current relative to the charging cut-off current measured at the room temperature of 25° C.

According to implementations, the electronic device can dynamically regulate the charging cut-off current according to the temperature, such that a voltage which exceeds the rated voltage can be applied to the battery for overvoltage charging, and thus the constant-voltage charging stage is omitted. The charging cut-off current in the constant-current charging stage is regulated based on the temperature, thereby ensuring that the real voltage across the cell does not exceed the rated voltage by controlling a float voltage in the constant-current charging stage.

It is to be noted that, the expression "a voltage which exceeds the rated voltage can be applied to the battery for overvoltage charging" can be comprehended as that the open-circuit voltage of the battery can be higher than the rated voltage. The real voltage across the cell is lower than the open-circuit voltage, and a sum of the real voltage across the cell and a voltage of the internal resistance of the battery is equal to the open-circuit voltage of the battery.

In some implementations, the charging cut-off current of the battery is further regulated according to the open-circuit voltage, the rated voltage, and the internal resistance as follows.

At block 406, a present electric quantity of the battery is acquired when the temperature reaches a first preset temperature.

The electronic device acquires the temperature of the battery during charging of the battery. The internal resistance of the battery will increase with decrease in the temperature and decrease with increase in the temperature. At the same time, the charging cut-off current of the battery is inversely proportional to the internal resistance of the battery, and accordingly the charging cut-off current of the battery is directly proportional to the temperature, that is, the temperature of the battery will increase with increase in the charging cut-off current. When the temperature of the battery reaches the first preset temperature, the electric quantity of the battery can be acquired.

The electric quantity can refer to a percentage of available electric quantity relative to a nominal capacity of the battery. The present electric quantity reflects a state of charge (SOC) of the battery. The electronic device can control a working state of the battery according to the present electric quantity.

In an example, the electronic device acquires the electric quantity of the battery with a built-in coulomb counter. Based on Faraday's laws, the coulomb counter can accurately calculate, according to the amount of substance reacting on an electrode, the electric quantity through a circuit. The present electric quantity of the battery can be acquired based on the coulomb counter. The coulomb counter may be disposed outside the battery or may be a built-in coulomb counter of the battery, and there is no restriction on the position of the coulomb counter in implementations.

It is to be noted that, the first preset temperature can be comprehended as a temperature which is likely to affect the performance of the battery. If the battery stays in such a temperature for a preset duration, the battery is likely to be damaged. The first preset temperature may be set to 45° C. or other values.

At block 408, the charging cut-off current is regulated according to the present electric quantity.

The electronic device can regulate the charging cut-off current corresponding to the present temperature according to the present electric quantity acquired. In an example, the electronic device acquires a present charging interval according to the present electric quantity of the battery. For example, electric quantity of 10-50% belongs to a first charging interval, electric quantity of 50-80% belongs to a second charging interval, and electric quantity of 80-100% belongs to a third charging interval.

When the electric quantity is in the first charging interval, the charging cut-off current is maintained, that is, the charging cut-off current remains unchanged. When the electric quantity is in the second charging interval or the third charging interval, the charging cut-off current is decreased, and a magnitude of decrease in the second charging interval is different from that in the third charging interval, where a higher charging interval corresponds to a greater magnitude of decrease.

In some implementations, the charging cut-off current of the battery is further regulated according to the open-circuit voltage, the rated voltage, and the internal resistance as follows.

At block 410, when the temperature reaches a second preset temperature, the charging cut-off current is decreased according to a preset stepping value, where the second preset temperature is higher than the first preset temperature.

The electronic device acquires periodically the temperature of the battery. When the temperature of the battery increases continuously and reaches the second preset temperature, the electronic device decreases the charging cut-off current according to the preset stepping value. The second preset temperature is higher than the first preset temperature. The second preset temperature is a temperature which can affect the performance of the battery, and the second preset temperature can be set to 55° C. or other values, which is not limited herein.

In some implementations, the charging control method further includes operations at block 502 to block 506.

At block 502, the temperature of the battery is acquired when the electronic device is in the charging state.

When the electronic device is in use, the electronic device can detect periodically a voltage of an input end of a charging circuit or detect a voltage of a charging chip, to determine whether the electronic device such as a smart phone is in a charging state. When the electronic device is in the charging state, the temperature of the battery can be acquired with a built-in temperature sensor of the electronic device.

At block 504, the battery is charged in a pulse charging mode when the temperature is lower than a preset threshold temperature.

When the battery of the electronic device is in a low temperature, the internal resistance of the battery increases. In particular, when the temperature is lower than 0° C., charging will easily result in side reactions such as precipitation of lithium ion at the negative electrode, which can further cause safety problems. When the temperature is lower than the preset threshold temperature, the battery is charged in the pulse charging mode. The pulse charging mode includes at least one of a positive pulse charging and a positive/negative pulse charging, where the negative pulse charging of the battery is equivalent to an active discharging of the battery.

In an example, the pulse charging mode can be understood as the positive/negative pulse charging, that is, repeated pulse charging and discharging of the battery. In other words, the battery is charged for a first preset duration and then discharged for a second preset duration, and the same is repeated. Joule heat produced through the internal resistance of the battery will diffuse inside the battery to evenly heat the battery until the temperature of the battery reaches the preset threshold temperature.

In an example, in the pulse charging mode, a charging current for pulse charging can also be set, which may be a constant current or a varying current. According to implementations, the pulse charging mode may include a constant current pulse, a varying current pulse, a positive/negative pulse, or the like. For different stages of pulse charging, the pulse charging mode may be the same or different.

At block 506, the pulse charging mode is switched to the constant-current charging mode, when the temperature reaches the preset threshold temperature while the battery is in the pulse charging mode.

The electronic device acquires periodically the temperature of the battery and switches the pulse charging mode to the constant-current charging mode when the temperature reaches the preset threshold temperature. In other words, the electronic device regulates, according to the present temperature, the charging cut-off current in the constant-current charging mode and applies the charging cut-off current regulated to the battery.

In the charging control method provided herein, the battery is charged in the pulse charging mode when the temperature is lower than the preset threshold temperature, such that joule heat can be produced inside the battery, thereby increasing the temperature of the battery. When the temperature reaches the preset threshold temperature, the pulse charging mode is switched to the constant-current charging mode. As such, the battery can be charged in a low temperature, which is safe and reliable, has a high charging efficiency, and can prolong the service life of the battery.

In some implementations, the charging control method further includes operations at block 602 to block 612.

At block 602, state information of the battery is acquired when the electronic device is in a charging state.

When the electronic device is in use, the electronic device can detect whether the electronic device such as a smart phone is in the charging state by detecting periodically a voltage of an input end of a charging circuit or by detecting a voltage of a charging chip. When the electronic device is in the charging state, the electronic device acquires the state information of the battery, where the state information is indicative of at least one of: the temperature, a voltage of the battery, and a maximum charging rate of the battery.

At block 604, the multi-stage constant-current charging of the constant-current charging mode is determined according to the state information.

In an example, the state information is the voltage of the battery. The electronic device acquires the voltage of the battery and regulates, according to the voltage of the battery acquired, a charging current corresponding to a present charging stage and the number of stages of the multi-stage constant-current charging in the constant-current charging mode.

In another example, the state information is the temperature or the maximum charging rate of the battery. The electronic device acquires a mapping relationship between the temperature and the maximum charging rate, determines, according to the mapping relationship, the maximum charging rate corresponding to the present temperature of the battery, and regulates, according to the maximum charging rate determined, a charging current corresponding to a present charging stage and the number of stages of the multi-stage constant-current charging in the constant-current charging mode.

In an example, the state information further includes a service life of the battery. The electronic device can determine the charging current corresponding to the present charging stage and the number of stages of the multi-stage constant-current charging in the constant-current charging mode by taking comprehensively into consideration the service life of the battery, the temperature, and the maximum charging rate.

At block 606, a charging parameter currently used for charging the battery is acquired, when the electronic device is in the constant-current charging mode. Operations at block 606 correspond to operations at foregoing block 102, which will not be described in detail herein.

At block 608, the temperature of the battery, an open circuit-voltage of the battery, and a rated voltage of a cell of the battery are acquired when the charging parameter reaches a preset parameter.

In an example, the charging parameter is a charging current. When the charging parameter acquired by the electronic device reaches the preset parameter, the present temperature of the battery, the open circuit-voltage of the battery, and the rated voltage of the cell of the battery can be acquired. Operations of acquiring the present temperature of the battery correspond to operations at foregoing block 104, which is not described in detail herein. Operations of acquiring the open circuit-voltage of the battery and the rated voltage of the cell of the battery correspond to operations at foregoing block 204, which will not be described in detail herein.

At block 610, an internal resistance of the battery is acquired according to the temperature.

At block 612, the charging cut-off current of the battery is regulated according to the open-circuit voltage, the rated voltage, and the internal resistance.

Operations at block 610 correspond to operations at foregoing block 202, and operations at block 612 correspond to operations at foregoing block 206, which will not be described in detail herein.

According to implementations, the electronic device acquires the state information of the battery and determines the multi-stage constant-current charging in the constant-current charging mode according to the state information. When the electronic device is in the constant-current charging mode, the electronic device acquires the charging parameter currently used for charging the battery. When the charging parameter reaches the preset parameter, the electronic device acquires the temperature of the battery and adjusts, according to the temperature, the charging cut-off current of the battery. The electronic device applies the charging cut-off current to the battery until the battery is fully charged. In this way, dynamic regulation of the charging cut-off current according to the temperature can be achieved, such that a voltage which exceeds the rated voltage can be applied to the battery for overvoltage charging, which can omit the constant-voltage charging stage and prolong a duration of the constant-current charging mode, thereby improving charging efficiency. Meanwhile, dynamic regulation of the charging cut-off current according to the temperature can ensure that the battery will be fully charged, without being damaged due to overvoltage in the constant-current charging stage.

It should be understood that, although various steps in the flowcharts of FIG. 2 and FIGS. 4-6 are sequentially displayed as indicated by the arrows, these steps are not necessarily performed in the order indicated by the arrows. Unless explicitly stated herein, the order of execution of these steps is not strictly limited, and the steps may be performed in other orders. In addition, at least some of the steps in FIG. 2 and FIGS. 4-6 may include multiple sub-steps or stages, which are not necessarily performed at the same time. Instead, these sub-steps or stages may be executed at different times. These sub-steps or stages are not necessarily performed sequentially. Instead, these sub-steps or stages may be performed alternately with at least some of other steps or sub-steps or stages of other steps.

Figure 7:
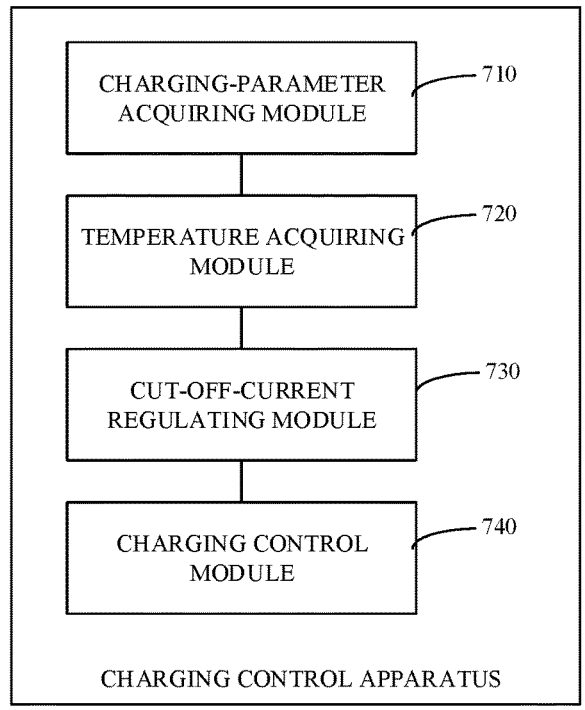
FIG. 7 is a schematic block diagram illustrating an internal structure of a charging control apparatus according to implementations.

As illustrated in FIG. 7, implementations also provide a charging control apparatus. The apparatus includes a charging-parameter acquiring module 710, a temperature acquiring module 720, a cut-off-current regulating module 730, and a charging control module 740. The charging-parameter acquiring module 710 is configured to acquire a charging parameter currently used for charging a battery when an electronic device is in a constant-current charging mode. The temperature acquiring module 720 is configured to acquire a temperature of the battery when the charging parameter reaches a preset parameter. The cut-off-current regulating module 730 is configured to regulate, according to the temperature, a charging cut-off current of the battery. The charging control module 740 is configured to apply continuously the charging cut-off current to the battery until the battery is fully charged.

In the charging control apparatus provided herein, the charging-parameter acquiring module is configured to acquire the charging parameter currently used for charging the battery when the electronic device is in the constant-current charging mode. The temperature acquiring module is configured to acquire the temperature of the battery when the charging parameter reaches the preset parameter. The cut-off-current regulating module is configured to regulate, according to the temperature, the charging cut-off current of the battery. The charging control module is configured to apply continuously the charging cut-off current to the battery until the battery is fully charged. As such, a duration of the constant-current charging mode is prolonged, and a constant-voltage charging stage is omitted, which is possible to improve charging efficiency. At the same time, the charging cut-off current can be dynamically regulated according to the temperature, which can ensure that the battery can be fully charged, without being damaged due to overvoltage in a constant-current charging stage.

In an example, the cut-off-current regulating module 730 includes an internal-resistance acquiring unit, a voltage acquiring unit, and a regulating unit. The internal-resistance acquiring unit is configured to acquire an internal resistance of the battery according to the temperature. The voltage acquiring unit is configured to acquire an open-circuit voltage of the battery and a rated voltage of a cell of the battery. The regulating unit is configured to regulate the charging cut-off current of the battery according to the open-circuit voltage, the rated voltage, and the internal resistance.

In an example, the internal-resistance acquiring unit is further configured to operate as follows. The internal-resistance acquiring unit is configured to establish a mapping relationship between the internal resistance and the temperature. The internal-resistance acquiring unit is configured to determine, according to the mapping relationship, the internal resistance corresponding to the temperature.

In an example, the regulating unit is further configured to operate as follows. The regulating unit is configured to acquire a difference between the open-circuit voltage and the rated voltage. The regulating unit is configured to regulate the charging cut-off current of the battery according to the difference and the internal resistance, where the internal resistance is inversely proportional to the charging cut-off current.

In an example, the cut-off-current regulating module 730 further includes an electric-quantity acquiring unit and a regulating unit. The electric-quantity acquiring unit is configured to acquire a present electric quantity of the battery when the temperature reaches a first preset temperature. The regulating unit is configured to regulate the charging cut-off current according to the present electric quantity.

In an example, the cut-off-current regulating module 730 is further configured to decrease the present charging cut-off current when the temperature reaches a second preset temperature, where the second preset temperature is higher than the first preset temperature.

In an example, the constant-current charging mode involves multi-stage constant-current charging, and each stage of the multi-stage constant-current charging has a different charging parameter.

Figure 8:
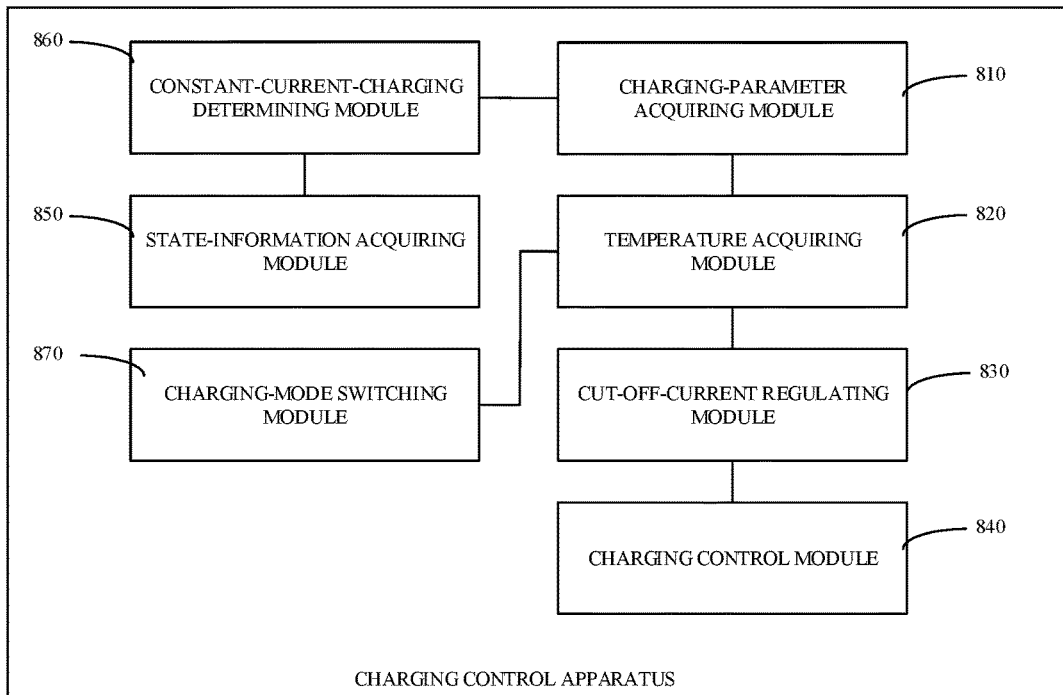
FIG. 8 is a schematic block diagram illustrating an internal structure of a charging control apparatus according to other implementations.

As illustrated in FIG. 8, a charging control apparatus is provided. In an example, the charging control apparatus includes a charging-parameter acquiring module 810, a temperature acquiring module 820, a cut-off-current regulating module 830, and a charging control module 840. The charging control apparatus further includes a state-information acquiring module 850 and a constant-current-charging determining module 860. The state-information acquiring module 850 is configured to acquire state information of the battery when the electronic device is in a charging state. The constant-current-charging determining module 860 is configured to determine, according to the state information, the multi-stage constant-current charging in the constant-current charging mode.

In an example, the state information is indicative of at least one of: the temperature, a voltage of the battery, and a maximum charging rate of the battery.

According to implementations, the electronic device acquires the state information of the battery and determines, according to the state information, the multi-stage constant-current charging in the constant-current charging mode. When the electronic device is in the constant-current charging mode, the electronic device acquires the charging parameter currently used for charging the battery. When the charging parameter reaches the preset parameter, the electronic device acquires the temperature of the battery. The electronic device regulates, according to the temperature, the charging cut-off current of the battery. The electronic device applies continuously the charging cut-off current to the battery until the battery is fully charged. In this way, the charging cut-off current can be dynamically regulated according to the temperature, such that a voltage which exceeds the rated voltage can be applied to the battery for overvoltage charging, which is possible to omit a constant-voltage charging stage and prolong a duration of constant-current charging stage, thereby improving charging efficiency. At the same time, dynamic regulation of the charging cut-off current according to the temperature can ensure that the battery is not damaged due to overvoltage in the constant-current charging stage while ensuring that the battery can be fully charged.

In an example, the charging control apparatus further includes a charging-mode switching module 870. The charging-mode switching module 870 is configured to: acquire the temperature of the battery when the electronic device is in the charging state; charge the battery in a pulse charging mode when the temperature is lower than a preset threshold temperature; switch the pulse charging mode to the constant-current charging mode when the temperature reaches the preset threshold temperature while the battery is in the pulse charging mode.

In an example, the pulse charging mode includes at least one of a positive pulse charging and a positive/negative pulse charging.

In the charging control apparatus provided herein, the charging-mode switching module is configured to charge the battery in the pulse charging mode when the temperature is lower than the preset threshold temperature, such that joule heat can be produced inside the battery, thereby increasing the temperature of the battery. The charging-mode switching module is configured to switch the pulse charging mode to the constant-current charging mode when the temperature reaches the preset threshold temperature, such that the battery can be charged in a low temperature, which is possible to achieve safety and reliability, a higher charging efficiency, and a longer service life of the battery.

The above division of units in the charging control apparatus is just illustrative. In other implementations, a different manner of division in the charging control apparatus can be adopted according to actual needs, to achieve all or part of the functions of the charging control apparatus.

Each module of the charging control apparatus may be implemented wholly or partly by software, hardware, and combinations thereof. Each module may be embedded in or independent of a processor of the electronic device in the form of hardware, or may be stored in a memory of the electronic device in the form of software, so that the processor invokes the operations corresponding to the above modules.

Implementations further provide a computer readable storage medium, which is a non-volatile computer readable storage medium storing one or more computer executable instructions. The one or more computer executable instructions, when executed by one or more processors, are operable with the one or more processors to: acquire a charging parameter currently used for charging a battery when an electronic device is in a constant-current charging mode; acquire a temperature of the battery when the charging parameter reaches a preset parameter; regulate, according to the temperature, a charging cut-off current of the battery; apply continuously the charging cut-off current to the battery until the battery is fully charged.

A computer program product includes instructions which, when executed by a computer, are operable with the computer to: acquire a charging parameter currently used for charging a battery when an electronic device is in a constant-current charging mode; acquire a temperature of the battery when the charging parameter reaches a preset parameter; regulate, according to the temperature, a charging cut-off current of the battery; apply continuously the charging cut-off current to the battery until the battery is fully charged.

Figure 9:
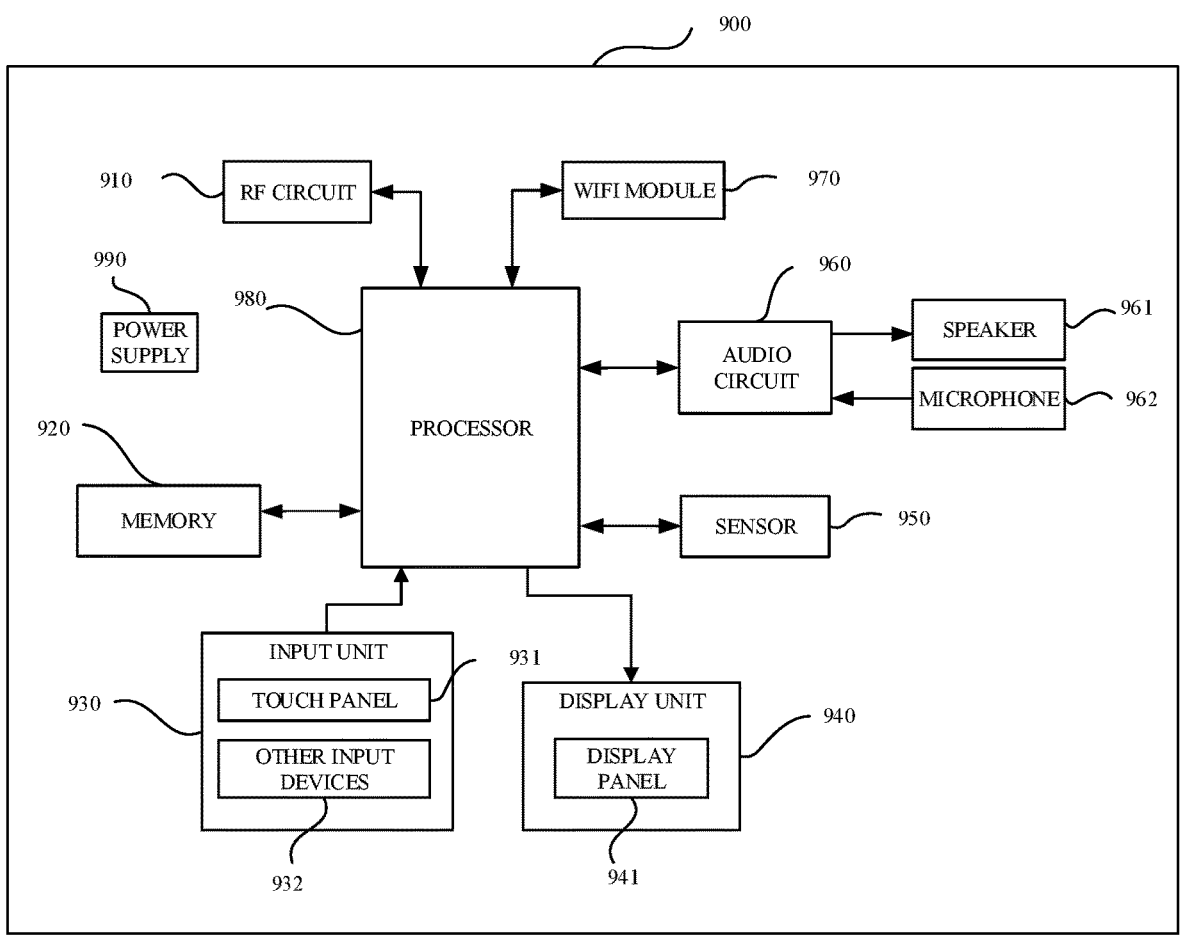
FIG. 9 is a block diagram illustrating a part of a structure of a mobile phone related to an electronic device according to implementations.

Implementations further provide an electronic device. As illustrated in FIG. 9, for the convenience of description, only parts related to the implementations are illustrated. For technical details not described, reference may be made to the method implementations. The electronic device may be any electronic device, such as a mobile phone, a tablet computer, a personal digital assistant (PDA), a point of sale (POS) terminal, an on-board computer, a wearable device, and the like. The following describes the mobile phone as an example of the electronic device.

FIG. 9 is a block diagram illustrating a part of a structure of a mobile phone related to an electronic device according to implementations. As illustrated in FIG. 9, the mobile phone includes a radio frequency (RF) circuit 910, a memory 920, an input unit 930, a display unit 940, a sensor 950, an audio circuit 960, a wireless fidelity (Wi-Fi) module 970, a processor 980, a power supply 990, and the like. Those skilled in the art can understand that the structure of the mobile phone illustrated in FIG. 9 does not constitute any limitation on a mobile phone. The mobile phone may include more or fewer components than illustrated or may combine certain components or have different configurations or arrangements of components.

The RF circuit 910 is configured to transmit or receive information, or transmit or receive signals during a phone call. After receiving downlink information from a base station, the RF circuit 910 can send the downlink information to the processor 980 for processing. The RF circuit 910 can also send uplink data to the base station. Generally, the RF circuit 910 includes but is not limited to an antenna, at least one amplifier, a transceiver, a coupler, a low noise amplifier (LNA), a duplexer, and the like. In addition, the RF circuit 910 may also communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The memory 920 is configured to store software programs and modules, and the processor 980 is configured to execute various function applications and data processing of the mobile phone by running the software programs and the modules stored in the memory 920. The memory 920 mainly includes a program storage area and a data storage area. The program storage area may store an operating system, application programs required for at least one function (such as a sound playback application, an image playback application, etc.), and so on. The data storage area may store data (such as audio data, contact list, etc.) created according to use of the mobile phone, and so on. In addition, the memory 920 may include a high-speed random access memory (RAM), and may further include a non-volatile memory such as at least one disk storage device, a flash device, or other non-volatile solid storage devices.

The input unit 930 may be configured to receive input digital or character information and generate key signal input associated with user setting and function control of the mobile phone 900. As one example, the input unit 930 may include a touch panel 931 and other input devices 932. The touch panel 931, also referred to as a touch screen, can collect touch operations of the user on or near it (for example, touch operations of the user on the touch panel 931 or near the touch panel 931 with a finger, a stylus, or the like) and drive a corresponding connection device according to a preset program. In an example, the touch panel 931 can include a touch detection device and a touch controller. The touch detection device detects the touch orientation of the user, detects a signal generated by the touch operation, and transmits the signal to the touch controller. The touch controller receives the touch information from the touch detection device, converts the touch information into contact coordinates and sends the contact coordinates to the processor 980. The touch controller can also receive and execute commands from the processor 980. In addition, the touch panel 931 can be implemented as a resistive touch panel, a capacitive touch panel, an infrared touch panel, and a surface acoustic wave touch panel. In addition to the touch panel 931, the input unit 930 may further include other input devices 932. The other input devices 932 may include, but are not limit to, one or more of a physical key, a function key (such as a volume control key, a switch key, etc.), and the like.

The display unit 940 is configured to display information input by the user or information provided for the user and various menus of the mobile phone. The display unit 940 may include a display panel 941. In an example, the display panel 941 may be in the form of a liquid crystal display (LCD), an organic light-emitting diode (OLED), and so on. In an example, the touch panel 931 can cover the display panel 941. When the touch panel 931 detects a touch operation on or near it, the touch panel 931 transmits the touch operation to the processor 980 to determine the type of touch event. Then the processor 980 provides, according to the type of touch event, a corresponding visual output on the display panel 941. Although the touch panel 931 and the display panel 941 are illustrated as two separate components in FIG. 9 to realize the input and output functions of the mobile phone, in some examples, the touch panel 931 and the display panel 941 may be integrated to implement the input and output functions of the mobile phone.

The mobile phone 900 may also include at least one sensor 950, such as a light sensor, a motion sensor, and other sensors. As one example, the light sensor may include an ambient light sensor and a proximity sensor, among which the ambient light sensor may adjust the brightness of the display panel 941 according to ambient lights, and the proximity sensor may turn off the display panel 941 and/or backlight when the mobile phone reaches near the ear. As a kind of motion sensor, the accelerometer sensor can detect the magnitude of acceleration in various directions and when the mobile phone is stationary, detect the magnitude and direction of gravity, and identify mobile-phone gesture related applications (such as vertical and horizontal screen switch). The accelerometer sensor can also be used for vibration-recognition related functions (such as a pedometer, percussion), and so on. The mobile phone can also be equipped with a gyro-sensor, an atmospheric pressure sensor, a humidity sensor, a temperature sensor, an infrared sensor, and other sensors.

The audio circuit 960, a speaker 961, a microphone 962 may provide an audio interface between the user and the mobile phone. The audio circuit 960 may convert the received audio data into electrical signals and transmit the electrical signals to the speaker 961. The speaker 961 converts the electrical signals into sound signals for output. On the other hand, the microphone 962 converts the received sound signals into electrical signals, which will be received and converted into audio data by the audio circuit 960 for output. The audio data is then processed by the processor 980 and transmitted via the RF circuit 910 to another mobile phone, or the audio data is output to the memory 920 for further processing.

Wi-Fi belongs to a short-range wireless transmission technology. With aid of the Wi-Fi module 970, the mobile phone may assist the user in E-mail receiving and sending, webpage browsing, access to streaming media, and the like. Wi-Fi provides users with wireless broadband Internet access. Although the Wi-Fi module 970 is illustrated in FIG. 9, the Wi-Fi module 970 is not essential to the mobile phone 900 and can be omitted according to actual needs.

The processor 980 is the control center of the mobile phone and is configured to connect various parts of the whole mobile phone through various interfaces and lines. The processor 980 runs or executes software programs and/or modules stored in the memory 920 and invokes data stored in the memory 920 to perform various functions of the mobile phone and process data, thereby monitoring the mobile phone as a whole. In an example, the processor 980 may include one or more processing units. In an example, the processor 980 may integrate an application processor and a modem processor, where the application processor is configured to handle an operating system, a user interface, an application, and so on, and the modem processor is mainly configured to process wireless communication. It will be understood that the modem processor herein may not be integrated into the processor 980.

The mobile phone 900 also includes the power supply 990 (e.g., a battery) that supplies power to various components. For instance, the power supply 990 may be logically connected to the processor 980 via a power management system to enable management of charging, discharging, and power consumption through the power management system.

In an example, the mobile phone 900 may further include a camera, a Bluetooth module, etc.

In some implementations, computer programs stored in the memory, when executed by the processor 980 of the electronic device, are operable with the processor 980 to: acquire a charging parameter currently used for charging a battery when the electronic device is in a constant-current charging mode; acquire a temperature of the battery when the charging parameter reaches a preset parameter; regulate, according to the temperature, a charging cut-off current of the battery; apply continuously the charging cut-off current to the battery until the battery is fully charged.

Any memory, storage, database or other mediums used herein may include a non-volatile and/or a volatile memory. The non-volatile memory can include a read-only memory (ROM), a programmable ROM (PROM), an electrically programmable ROM (EPROM), an electrically erasable programmable ROM (EEPROM), or a flash memory. The volatile memory can include a RAM, which acts as an external cache. By way of illustration but not limitation, a RAM is available in a variety of forms, such as a static RAM (SRAM), a dynamic RAM (DRAM), a synchronous DRAM (SDRAM), a dual data rate SDRAM (DDR SDRAM), an enhanced SDRAM (ESDRAM), a synchlink DRAM (SLDRAM), a rambus direct RAM (RDRAM), a direct rambus dynamic RAM (DRDRAIVI), and a rambus dynamic RAM (RDRAM).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A charging control method for charging a battery of an electronic device, and the method comprising:
   acquiring a charging parameter currently used for charging the battery, when the electronic device is in a constant-current charging mode;
   acquiring a temperature of the battery when the charging parameter reaches a preset parameter;
   acquiring an internal resistance of the battery according to the temperature;
   acquiring an open-circuit voltage of the battery and a rated voltage of a cell of the battery; and
   acquiring a difference between the open-circuit voltage and the rated voltage; and
   regulating the charging cut-off current of the battery according to the difference and the internal resistance, wherein the internal resistance is inversely proportional to the charging cut-off current; and
   applying continuously the charging cut-off current to the battery until the battery is fully charged.

2. The method of claim 1, wherein acquiring the internal resistance of the battery according to the temperature comprises:
   establishing a mapping relationship between the internal resistance and the temperature; and
   determining, according to the mapping relationship, the internal resistance corresponding to the temperature.

3. The method of claim 1, wherein regulating the charging cut-off current of the battery according to the open-circuit voltage, the rated voltage, and the internal resistance further comprises:
   acquiring a present electric quantity of the battery when the temperature reaches a first preset temperature; and
   regulating the charging cut-off current according to the present electric quantity.

4. The method of claim 3, wherein regulating the charging cut-off current according to the present electric quantity comprises:
   determining from a plurality of preset electric quantity ranges an electric quantity range that the present electric quantity falls into, wherein the plurality of preset electric quantity ranges comprises a first electric quantity range, a second electric quantity range, and a third electric quantity range that increase in turn; and
   one of:
   maintaining the charging cut-off current when the present electric quantity falls into the first range;
   decreasing the charging cut-off current when the present electric quantity falls into the second range by a first amplitude; or
   decreasing the charging cut-off current when the present electric quantity falls into the third range by a second amplitude, wherein the second amplitude is greater than the first amplitude.

5. The method of claim 3, further comprising:
   decreasing the present charging cut-off current when the temperature reaches a second preset temperature, wherein the second preset temperature is higher than the first preset temperature.

6. The method of claim 1, wherein the constant-current charging mode involves multi-stage constant-current charging, and each stage of the multi-stage constant-current charging has a different charging parameter.

7. The method of claim 6, further comprising:
   acquiring state information of the battery when the electronic device is in a charging state; and
   determining, according to the state information, the multi-stage constant-current charging in the constant-current charging mode.

8. The method of claim 7, wherein the state information is indicative of at least one of: the temperature, a voltage of the battery, and a maximum charging rate of the battery.

9. The method of claim 1, further comprising:
   acquiring the temperature of the battery when the electronic device is in the charging state;
   charging the battery in a pulse charging mode when the temperature is lower than a preset threshold temperature; and
   switching the pulse charging mode to the constant-current charging mode, when the temperature reaches the preset threshold temperature while the battery is in the pulse charging mode.

10. The method of claim 9, wherein the pulse charging mode comprises at least one of a positive pulse charging and a positive/negative pulse charging.

11. A charging control apparatus configured to charge a battery of an electronic device, comprising a processor and a non-transitory memory configured to store computer readable instructions which, when executed by the processor, are operable with the processor to:
   acquire a charging parameter currently used for charging the battery when the electronic device is in a constant-current charging mode;
   acquire a temperature of the battery when the charging parameter reaches a preset parameter;
   regulate, according to the temperature, a charging cut-off current of the battery;
   apply continuously the charging cut-off current to the battery until the battery is fully charged;
   acquire the temperature of the battery when the electronic device is in the charging state;
   charge the battery in a pulse charging mode when the temperature is lower than a preset threshold temperature; and
   switch the pulse charging mode to the constant-current charging mode, when the temperature reaches the preset threshold temperature while the battery is in the pulse charging mode.

12. The charging control apparatus of claim 11, wherein the processor configured to regulate, according to the temperature, a charging cut-off current of the battery is configured to:

acquire an internal resistance of the battery according to the temperature;

acquire an open-circuit voltage of the battery and a rated voltage of a cell of the battery; and regulate the charging cut-off current of the battery according to the open-circuit voltage, the rated voltage, and the internal resistance.

13. The charging control apparatus of claim 12, wherein the processor configured to acquire the internal resistance of the battery according to the temperature is configured to:

establish a mapping relationship between the internal resistance and the temperature; and determine, according to the mapping relationship, the internal resistance corresponding to the temperature.

14. The charging control apparatus of claim 13, wherein the processor configured to regulate the charging cut-off current of the battery according to the open-circuit voltage, the rated voltage, and the internal resistance is configured to:

acquire a present electric quantity of the battery when the temperature reaches a first preset temperature; and regulate the charging cut-off current according to the present electric quantity.

15. The charging control apparatus of claim 13, wherein the processor is further configured to:

decrease the present charging cut-off current when the temperature reaches a second preset temperature, wherein the second preset temperature is higher than the first preset temperature.

16. The charging control apparatus of claim 12, wherein the processor configured to regulate the charging cut-off current of the battery according to the open-circuit voltage, the rated voltage, and the internal resistance is configured to:

acquire a difference between the open-circuit voltage and the rated voltage; and regulate the charging cut-off current of the battery according to the difference and the internal resistance, wherein the internal resistance is inversely proportional to the charging cut-off current.

17. A non-transitory computer readable storage medium configured to store computer programs which, when executed by a processor, are operable with the processor to:

acquire a charging parameter currently used for charging the battery when the electronic device is in a constant-current charging mode;

acquire a temperature of the battery when the charging parameter reaches a preset parameter;

regulate, according to the temperature, a charging cut-off current of the battery; and apply continuously the charging cut-off current to the battery until the battery is fully charged;

wherein the constant-current charging mode involves multi-stage constant-current charging, and each stage of the multi-stage constant-current charging has a different charging parameter.

* * * * *